(12) United States Patent
Kim et al.

(10) Patent No.: US 12,494,476 B2
(45) Date of Patent: Dec. 9, 2025

(54) SECONDARY BATTERY

(71) Applicant: LG ENERGY SOLUTION, LTD., Seoul (KR)

(72) Inventors: Young Jae Kim, Daejeon (KR); Jung Woo Yoo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 772 days.

(21) Appl. No.: 17/292,378

(22) PCT Filed: Mar. 12, 2020

(86) PCT No.: PCT/KR2020/003471
§ 371 (c)(1),
(2) Date: May 7, 2021

(87) PCT Pub. No.: WO2020/185013
PCT Pub. Date: Sep. 17, 2020

(65) Prior Publication Data
US 2022/0013766 A1 Jan. 13, 2022

(30) Foreign Application Priority Data

Mar. 12, 2019 (KR) ........................ 10-2019-0028272

(51) Int. Cl.
| | | |
|---|---|---|
| H01M 4/131 | (2010.01) | |
| H01M 4/02 | (2006.01) | |
| H01M 4/134 | (2010.01) | |
| H01M 4/38 | (2006.01) | |
| H01M 4/505 | (2010.01) | |
| H01M 4/525 | (2010.01) | |
| H01M 4/62 | (2006.01) | |
| H01M 10/0525 | (2010.01) | |
| H01M 10/42 | (2006.01) | |

(52) U.S. Cl.
CPC ........... *H01M 4/134* (2013.01); *H01M 4/131* (2013.01); *H01M 4/386* (2013.01); *H01M 4/505* (2013.01); *H01M 4/525* (2013.01); *H01M 4/622* (2013.01); *H01M 10/0525* (2013.01); *H01M 2004/021* (2013.01); *H01M 2010/4292* (2013.01)

(58) Field of Classification Search
CPC ...... H01M 4/134; H01M 4/131; H01M 4/386; H01M 4/505; H01M 4/525; H01M 4/622; H01M 10/0525; H01M 2004/021; H01M 2010/4292; H01M 2004/027
See application file for complete search history.

(56) References Cited

U.S. PATENT DOCUMENTS

| | | | |
|---|---|---|---|
| 2005/0106464 A1* | 5/2005 | Yoshida | ................ H01M 4/134 429/231.95 |
| 2006/0141359 A1 | 6/2006 | Yanagida et al. | |
| 2007/0218357 A1* | 9/2007 | Takagi | .................. H01M 4/382 429/231.95 |
| 2008/0014498 A1* | 1/2008 | Ogawa | .................. H01M 4/131 429/231.95 |
| 2009/0325061 A1 | 12/2009 | Lim | |
| 2011/0189546 A1 | 8/2011 | Ikeda | |
| 2013/0252094 A1 | 9/2013 | Sakaguchi et al. | |
| 2013/0309573 A1 | 11/2013 | Ohba et al. | |
| 2014/0272551 A1 | 9/2014 | Saruwatari et al. | |
| 2014/0336975 A1 | 11/2014 | Kim et al. | |
| 2015/0349382 A1* | 12/2015 | Kwon | ............... H01M 10/0587 429/94 |
| 2015/0380729 A1 | 12/2015 | Kojima et al. | |
| 2016/0197342 A1* | 7/2016 | Lee | ........................ H01M 4/587 429/223 |
| 2016/0233489 A1 | 8/2016 | Uhm et al. | |
| 2017/0200943 A1* | 7/2017 | Kawakami | ............. H01G 11/40 |
| 2018/0062158 A1* | 3/2018 | Kim | ...................... H01M 4/364 |
| 2019/0044128 A1* | 2/2019 | Mckinney | ............. H01M 4/587 |
| 2019/0148762 A1* | 5/2019 | Torita | ................. H01M 10/0525 429/209 |
| 2019/0157664 A1 | 5/2019 | Yamamoto et al. | |
| 2019/0260020 A1* | 8/2019 | Yamamoto | ........ H01M 10/0525 |
| 2019/0372095 A1 | 12/2019 | Kim et al. | |
| 2021/0249656 A1* | 8/2021 | Wang | .................... H01M 4/133 |

FOREIGN PATENT DOCUMENTS

| | | |
|---|---|---|
| CN | 1619875 | 5/2005 |
| CN | 101621132 | 1/2010 |
| CN | 104395741 A | 3/2015 |

(Continued)

OTHER PUBLICATIONS

European Search Report issued in corresponding European Patent Application No. 20769526.3, dated Nov. 26, 2021.
Yim et al., "Towards Improving the Practical Energy Density of Li-Ion Batteries: Optimization and Evaluation of Silicon:Graphite Composites in Full Cells," Journal of The Electrochemical Society, 2017, 164(1), pp. A6294-A6302.

(Continued)

*Primary Examiner* — Matthew T Martin
*Assistant Examiner* — Bartholomew A Hornsby
(74) *Attorney, Agent, or Firm* — Bryan Cave Leighton Paisner LLP

(57) ABSTRACT

The present invention provides a secondary battery including a negative electrode having a negative electrode active material layer containing a negative electrode active material, a positive electrode facing the negative electrode and having a positive electrode active material layer containing a positive electrode active material, a separator interposed between the negative electrode and the positive electrode, and an electrolyte, wherein the negative electrode active material includes a silicon-based active material and an N/P ratio calculated by a specific equation is 1.92 to 2.60.

12 Claims, No Drawings

(56) References Cited

FOREIGN PATENT DOCUMENTS

| | | |
|---|---|---|
| CN | 109075376 | 12/2018 |
| CN | 109449447 A | 3/2019 |
| JP | 2005-317309 A | 11/2005 |
| JP | 2007-157332 A | 6/2007 |
| JP | 2014-086231 A | 5/2014 |
| JP | 2015-149267 A | 8/2015 |
| JP | 2017147194 A * | 8/2017 |
| JP | 2018-147907 A | 9/2018 |
| KR | 10-2005-0048509 A | 5/2005 |
| KR | 10-2006-0076716 A | 7/2006 |
| KR | 10-2013-0129147 A | 11/2013 |
| KR | 10-2013-0132813 A | 12/2013 |
| KR | 10-2014-0116239 A | 10/2014 |
| KR | 10-2015-0014216 A | 2/2015 |
| KR | 10-2015-0015390 A | 2/2015 |
| KR | 10-2017-0074030 A | 6/2017 |
| KR | 10-2018-0113376 A | 10/2018 |
| KR | 10-2567400 B1 | 8/2023 |

OTHER PUBLICATIONS

International Search Report (with partial translation) and Written Opinion issued in corresponding International Patent Application No. PCT/KR2020/003471, dated Jun. 17, 2020.

\* cited by examiner

SECONDARY BATTERY

CROSS-REFERENCE TO RELATED APPLICATIONS

This application claims the benefit of Korean Patent Application No. 10-2019-0028272, filed on Mar. 12, 2019, in the Korean Intellectual Property Office, the disclosure of which is incorporated herein in its entirety by reference.

TECHNICAL FIELD

The present invention relates to a secondary battery.

BACKGROUND ART

Recently, the demand for a small and lightweight secondary battery having a relatively high capacity is rapidly increased due to the rapid spread of electronic devices using batteries, such as cell phones, notebook computers, electric vehicles, and the like. Particularly, a lithium secondary battery is lightweight and has a high energy density, and thus, is attracting attention as a driving power source for portable devices. Therefore, research and development efforts for improving the performance of a lithium secondary battery have been actively conducted.

Typically, a lithium secondary battery includes a positive electrode, a negative electrode, a separator interposed between the positive electrode and the negative electrode, an electrolyte, an organic solvent, and the like. In addition, a positive electrode and a negative electrode may have an active material layer including a positive electrode active material or a negative electrode active material on a current collector. In the positive electrode, a lithium-containing metal oxide such as $LiCoO_2$ or $LiMn_2O_4$ is used as a positive electrode active material, and accordingly, in the negative electrode, a carbon-based active material or a silicon-based active material not containing lithium is used as a negative electrode active material.

Particularly, among negative electrode active materials, a silicon-based active material is attracting attention in that it has a capacity of about 10 times higher than that of a carbon-based active material, and due to the high capacity thereof, the silicon-based active material has the advantage of being able to achieve a high energy density even with a thin electrode. However, a silicon-based active material is not universally used due to the problem of volume expansion according to charge/discharge and the deterioration in lifespan properties caused thereby.

Therefore, there is a demand for the development of a secondary battery capable of improving lifespan properties while implementing the high capacity and high energy density of a silicon-based active material.

Korean Patent Laid-Open No. 10-2017-0074030 relates to a negative electrode active material for a lithium secondary battery, a method for preparing the same, and a lithium secondary battery including the same, and discloses a negative electrode active material including a porous silicon-carbon composite. However, there is a limit in solving the above-mentioned problems.

PRIOR ART DOCUMENT

Patent Document

Korean Patent Laid-open Publication No. 10-2017-0074030

DISCLOSURE OF THE INVENTION

Technical Problem

An aspect of the present invention provides a secondary battery exhibiting improved capacity, energy density, and lifespan properties.

Technical Solution

According to an aspect of the present invention, there is provided a secondary battery including a negative electrode having a negative electrode active material layer containing a negative electrode active material, a positive electrode facing the negative electrode and having a positive electrode active material layer containing a positive electrode active material, a separator interposed between the negative electrode and the positive electrode, and an electrolyte, wherein the negative electrode active material includes a silicon-based active material and an N/P ratio calculated by Equation 1 below is 1.92 to 2.60.

$$N/P \text{ ratio} = \text{Discharge capacity per unit area of negative electrode/Discharge capacity per unit area of positive electrode.} \quad [\text{Equation 1}]$$

Advantageous Effects

A secondary battery of the present invention adjusts an N/P ratio, which is a ratio of discharge capacity of a positive electrode and a negative electrode, to be in a specific range, so that the influence of the problem of volume expansion of a negative electrode using a silicon-based active material on the secondary battery is minimized, thereby improving lifespan properties, and the implementation of high capacity, rate properties, and energy density due to the use of a silicon-based active material may be achieved.

MODE FOR CARRYING OUT THE INVENTION

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

The terminology used herein is for the purpose of describing particular exemplary embodiments only and is not intended to be limiting of the present invention. The terms of a singular form may include plural forms unless the context clearly indicates otherwise.

In the present specification, it should be understood that the terms "include", "comprise", or "have" are intended to specify the presence of stated features, numbers, steps, elements, or combinations thereof, but do not preclude the presence or addition of one or more other features, numbers, steps, elements, or combinations thereof.

In the present specification, an average particle diameter ($D_{50}$) may be defined as a particle diameter corresponding to 50% of the volume accumulation in a particle diameter distribution curve of a particle. The average particle diameter ($D_{50}$) may be measured by, for example, a laser diffraction method. The laser diffraction method generally enables measurement of a particle diameter from a submicron region to several millimeters, so that results of high reproducibility and high resolution may be obtained.

Hereinafter, the present invention will be described in more detail.

<Secondary Battery>

The present invention relates to a secondary battery, and more specifically, to a lithium secondary battery.

The secondary battery of the present invention includes a negative electrode having a negative electrode active material layer containing a negative electrode active material, a positive electrode facing the negative electrode and having a positive electrode active material layer containing a positive electrode active material, a separator interposed between the negative electrode and the positive electrode, and an electrolyte, wherein the negative electrode active material includes a silicon-based active material and an N/P ratio calculated by Equation 1 below is 1.92 to 2.60.

N/P ratio=Discharge capacity per unit area of negative electrode/Discharge capacity per unit area of positive electrode. [Equation 1]

In the present invention, the secondary battery has an N/P ratio of 1.92 to 2.60 calculated by Equation 1 above.

In the present invention, the "discharge capacity per unit area" means discharge capacity per unit area in the first cycle of a negative electrode or a positive electrode.

The discharge capacity per unit area of the negative electrode may be obtained by the following method. Specifically, a negative electrode sample including a negative electrode active material and a counter electrode (for example, a lithium metal electrode) facing the negative electrode sample are used to manufacture a half-cell. Discharge capacity measured by charging and discharging the half-cell was divided by the weight of the negative electrode active material to obtain "discharge capacity of the negative electrode sample per unit weight of the negative electrode active material." A negative electrode including the same negative electrode active material as the negative electrode active material used in the half-cell and a positive electrode including a positive electrode active material are used to manufacture a secondary battery. The "discharge capacity of the negative electrode sample per unit weight of the negative electrode active material" is multiplied by the weight of the negative electrode active material included in the secondary battery, and then divided by the area of the negative electrode included in the secondary battery to obtain discharge capacity per unit area of the negative electrode.

The discharge capacity per unit area of the positive electrode may be obtained by the following method. Specifically, a positive electrode sample including a positive electrode active material and a counter electrode (for example, a lithium metal electrode) facing the positive electrode sample are used to manufacture a half-cell. Discharge capacity measured by charging and discharging the half-cell was divided by the weight of the positive electrode active material to obtain "discharge capacity of the positive electrode sample per unit weight of the positive electrode active material." A positive electrode including the same positive electrode active material as the positive electrode active material used in the half-cell and a negative electrode including a negative electrode active material are used to manufacture a secondary battery. The "discharge capacity of the positive electrode sample per unit weight of the positive electrode active material" is multiplied by the weight of the positive electrode active material included in the secondary battery, and then divided by the area of the positive electrode included in the secondary battery to obtain discharge capacity per unit area of the positive electrode.

In a typical secondary battery, an N/P ratio is designed in consideration of the capacity balance between a positive electrode and a negative electrode. For example, the N/P ratio may be designed to be about 1.1 to 1.3. However, when a silicon-based active material is applied to a negative electrode for the typical secondary battery described above, theoretically, lithium from a positive electrode will be completely intercalated into all the silicon-based active material present in the negative electrode, so that the volume expansion problem of the silicon-based active material may be intensified thereby.

However, the secondary battery of the present invention uses a negative electrode including a negative electrode active material containing a silicon-based active material, and the ratio of the discharge capacity between a positive electrode and the negative electrode is controlled to be 1.92 to 2.60. In the case of the secondary battery of the present invention, the discharge capacity of the negative electrode is designed to be larger to a certain level than the discharge capacity of the positive electrode, and when lithium from the positive electrode is injected to the negative electrode, the ratio of the lithium to the total silicon-based active materials in the negative electrode may be reduced. Therefore, the secondary battery of the present invention reduces the use ratio of a silicon-based active material in a negative electrode to a certain level, and accordingly, may minimize, at the entire battery level, lifespan properties deterioration due to the volume expansion in the negative electrode.

In addition, the secondary battery of the present invention adjusts the N/P ratio to a certain level, and thus, may minimize the lifespan properties deterioration of the battery due to the volume expansion described above, and at the same time, may implement a secondary battery having a high energy density, rate properties, and capacity properties due to a silicon-based active material.

When the N/P ratio is less than 1.92, the use ratio of the silicon-based active material is increased when lithium is intercalated into the negative electrode, and the influence of the volume expansion caused by the charge of the silicon-based active material and the contraction caused by the discharge thereof on the secondary battery becomes excessive. Also, as the degree of contact between active materials decreases in accordance with the expansion/contraction of the active material, problems of electrical short circuit, resistance increase due to the disconnection of a conductive network, and lithium precipitation thereby occur, which may cause performance deterioration of the battery regarding lifespan properties and rate properties. When the N/P ratio is greater than 2.60, it is not preferable in that the negative electrode becomes excessively thick compared to the positive electrode as the negative electrode loading amount is increased, thereby increasing the distance between the negative electrode active material layer and the current collector, causing electrical conductivity to be reduced and the life properties of the battery to be deteriorated, and since the loading and thickness of the negative electrode becomes excessively large, energy density may be deteriorated.

The N/P ratio may be preferably 1.98 to 2.45, more preferably from 1.98 to 2.16. When in the above range, the capacity balance of the negative electrode and the positive electrode may be optimally controlled while minimizing the influence of the volume expansion/contraction of the silicon-based active material on the battery. Also, the thickness of the negative electrode active material layer may be adjusted to a desired level to improve the lifespan properties and energy density of the battery to a required level.

The negative electrode includes a negative electrode active material layer having a negative electrode active material. In addition, the negative electrode active material includes a silicon-based active material.

The silicon-based active material may include a compound represented by $SiO_x$ ($0 \leq x < 2$). Since $SiO_2$ does not react with lithium ions, thereby not being able to store lithium, it is preferable that x is in the above range.

Specifically, the silicon-based active material may include Si. Typically, Si is advantageous in that the capacity thereof is about 2.5 to 3 times higher than that of a silicon oxide (e.g., $SiO_x$ ($0 < x < 2$)). However, the volume expansion/contraction according to the charge and discharge of Si is much larger than that of a silicon oxide, so that it is not easy to commercialize Si. However, in the present invention, an N/P ratio is adjusted to the above-described level, so that the problem of the deterioration in lifespan properties caused by the volume expansion of a silicon-based active material in the entire secondary battery may be effectively solved, and the advantages of the silicon-based active material, such as high capacity, energy density, and rate properties may be more preferably implemented. More specifically, the silicon-based active material may be mostly composed of Si, or Si.

The average particle diameter ($D_{50}$) of the silicon-based active material may be 1 μm to 10 μm, preferably 2 μm to 6 μm, in terms of ensuring the structural stability of the active material during charging and discharging, more smoothly forming a conductive network to maintain electrical conductivity, or making it easier to access the binder for binding the active material and the current collector.

The negative electrode active material may be included in the negative electrode active material layer in an amount of 50 wt % to 80 wt %, preferably 65 wt % to 75 wt %, in terms of minimizing the influence of the volume expansion/contraction of the silicon-based active material on the battery as well as sufficiently implementing the high capacity of the silicon-based active material in the secondary battery.

The negative electrode active material layer may further include a negative electrode conductive material and/or a negative electrode binder in addition to the negative electrode active material.

The negative electrode binder may be used to improve the adhesion between the negative electrode active material layer and a negative electrode current collector to described later, or to improve the binding force between silicon-based active materials.

Specifically, in terms of further improving negative electrode adhesion and imparting resistance sufficient for volume expansion/contraction of a silicon-based active material, the negative electrode binder may include at least one selected from the group consisting of styrene butadiene rubber (SBR), acrylonitrile butadiene rubber, acrylic rubber, butyl rubber, fluoro rubber, carboxymethyl cellulose (CMC), starch, hydroxypropyl cellulose, regenerated cellulose, polyvinyl alcohol (PVA), polyacrylic acid (PAA), polyethylene glycol (PEG), polyacrylonitrile (PAN), and polyacryl amide (PAM).

Preferably, in terms of having high strength, having excellent resistance to volume expansion/contraction of a silicon-based active material, and imparting excellent flexibility to a negative electrode binder to prevent twisting, bending, and the like of an electrode, the negative electrode binder may include at least one selected from the group consisting of polyvinyl alcohol, polyacrylic acid, polyacrylonitrile, and polyacryl amide, preferably polyvinyl alcohol and polyacrylic acid. When the negative electrode binder includes polyvinyl alcohol and polyacrylic acid, the polyvinyl alcohol and the polyacrylic acid may be included in the negative electrode binder in a weight ratio of 50:50 to 90:10, preferably 55:45 to 80:20 in terms of further improving the above-mentioned effects.

The negative electrode binder may include those having a hydrogen in the negative electrode binder substituted with Li, Na, or Ca, in terms of facilitating dispersion in an aqueous solvent such as water when preparing a slurry for forming a negative electrode active material layer and improving binding force by more smoothly coating the active material.

The negative electrode binder may be included in the negative electrode active material layer in an amount of 10 wt % to 30 wt %, preferably 15 wt % to 25 wt %, and when in the above range, the problem of the volume expansion of an active material may be minimized by better binding the silicon-based active material and at the same time, the dispersion of the negative electrode binder may be facilitated when preparing a slurry for forming a negative electrode active material layer and coating properties and the phase stability of a slurry may be improved.

The negative electrode conductive material may be used to assist and improve conductivity in the secondary battery, and is not particularly limited as long as it has conductivity without causing a chemical change. Specifically, the negative electrode conductive material may include graphite such as natural graphite or artificial graphite; a carbon-based material such as carbon black, acetylene black, Ketjen black, channel black, furnace black, lamp black, and thermal black; conductive fiber such as carbon fiber and metal fiber; a conductive tube such as a carbon nanotube; fluorocarbon; metal powder such as aluminum powder, and nickel powder; a conductive whisker such as zinc oxide and potassium titanate; a conductive metal oxide such as titanium oxide; and a polyphenylene derivative, and may preferably include carbon black in terms of implementing high conductivity.

In terms of facilitating the dispersion of the negative electrode conductive material when preparing a slurry for forming a negative electrode active material layer and further improving electrical conductivity, the specific surface area of the negative electrode conductive material may be 80 $m^2$/g to 200 $m^2$/g, preferably 100 $m^2$/g to 150 $m^2$/g.

The negative electrode conductive material may be included in the negative electrode active material layer in an amount of 5 wt % to 20 wt %, preferably 7 wt % to 15 wt %, and when in the above range, it is preferable in terms of being able to form an excellent conductive network while alleviating the increase in resistance due to the negative electrode binder.

The thickness of the negative electrode active material layer may be 35 μm to 50 μm, preferably 36 μm to 40 μm, in consideration of the adjustment of the N/P ratio described above.

The negative electrode may further include a negative electrode current collector. The negative electrode current collector may formed on the negative electrode active material layer.

The negative electrode current collector is not particularly limited as long as it has conductivity without causing a chemical change in the battery. Specifically, copper, stainless steel, aluminum, nickel, titanium, fired carbon, copper or stainless steel that is surface-treated with one of carbon, nickel, titanium, silver, and the like, an aluminum-cadmium alloy, and the like may be used as the negative electrode current collector.

The negative electrode current collector may typically have a thickness of 3 μm to 500 μm.

The negative electrode current collector may have microscopic irregularities formed on the surface thereof to improve the adhesion of the negative electrode active material. For example, the negative electrode current collector may be used in various forms such as a film, a sheet, a foil, a net, a porous body, a foam, and a non-woven body.

The negative electrode may be manufactured by coating a negative electrode slurry including a negative electrode active material, and selectively, a negative electrode binder, a negative electrode conductive material, and a solvent for forming a negative electrode slurry on the negative electrode current collector, followed by drying and roll-pressing.

The solvent for forming a negative electrode slurry may include, for example, at least one selected from the group consisting of distilled water, ethanol, methanol, and isopropyl alcohol, preferably distilled water, in terms of facilitating the dispersion of the negative electrode active material, the negative electrode binder, and/or the negative electrode conductive material.

The solvent for forming a negative electrode slurry may be included in the negative electrode slurry in an amount such that the concentration of a solid including the negative electrode active material, and selectively, the negative electrode binder and the negative electrode conductive material is 15 wt % to 45 wt %, preferably 20 wt % to 30 wt %, more preferably 24 wt % to 27 wt %, in consideration of the viscosity, coating properties, and dispersibility of the negative electrode slurry.

The energy density of the negative electrode may be 493 Wh/L or higher, preferably 500 Wh/L to 577 Wh/L. The secondary battery of the present invention solves the volume expansion/contraction problem with silicon-based active material through the N/P ratio control of the range described above, thereby realizing high energy density characteristics with silicon-based active materials.

The porosity of the negative electrode may be 30% to 50%.

The porosity of the negative electrode may be preferably 37% to 45%, more preferably 38% to 41%, and when in the above range, the volume expansion/contraction of the silicon-based active material may be properly accommodated, and voids may be properly secured in the negative electrode to facilitate the entry or movement of the electrolyte, and since the degree of contact between active materials is maintained to an appropriate level to secure a conductive network between the active materials, lifespan properties and lifespan properties during high-sped charging may be improved. Particularly, a negative electrode having a porosity in the above range may secure sufficient voids in the negative electrode and secure a conductive network between active materials, and thus, when applied to a secondary battery having a relatively high N/P ratio, may implement excellent output properties, and accordingly, may improve lifespan properties, especially lifespan properties during high-speed charging.

In the present specification, the porosity of the negative electrode may be calculated by Equation 2 below.

$$\text{Porosity of negative electrode (\%)} = \{1 - (\text{True density of negative electrode/Electrode density of negative electrode})\} \times 100 \quad \text{[Equation 2]}$$

In Equation 2 above, the true density of a negative electrode is a density of a negative electrode active material layer measured by collecting the negative electrode to a certain size and then pressing the collected negative electrode with press equipment until the thickness of the negative electrode does not change, and the electrode density of a negative electrode is a density of a negative electrode active material layer measured by collecting the negative electrode to a certain size.

The positive electrode opposes the negative electrode, and includes a positive electrode active material layer.

The positive electrode active material layer may include a positive electrode active material.

The positive electrode active material is a compound capable of reversible intercalation and de-intercalation of lithium, and specifically, may include a lithium transition metal composite oxide including at least one transition metal selected from the group consisting of nickel, cobalt, manganese, and aluminum, and lithium, preferably a lithium transition metal composite oxide including a transition metal containing nickel, cobalt, and manganese, and lithium.

More specifically, the lithium transition metal composite oxide may be a lithium-manganese-based oxide (e.g., $LiMnO_2$, $LiMn_2O_4$, etc.), a lithium-cobalt-based oxide (e.g., $LiCoO_2$, etc.), a lithium-nickel-based oxide (e.g., $LiNiO_2$, etc.), a lithium-nickel-manganese-based oxide (e.g., $LiNi_{1-Y}Mn_YO_2$ (wherein 0<Y<1), $LiMn_{2-z}Ni_zO_4$ (wherein 0<Z<2), etc.), a lithium-nickel-cobalt-based oxide (e.g., $LiNi_{1-Y1}Co_{Y1}O_2$ (wherein 0<Y1<1), etc.), a lithium-manganese-cobalt-based oxide (e.g., $LiCo_{1-Y2}Mn_{Y2}O_2$ (wherein 0<Y2<1), $LiMn_{2-z1}Co_{z1}O_4$ (wherein 0<Z1<2), etc.), a lithium-nickel-manganese-cobalt-based oxide (e.g., $Li(Ni_p Co_q Mn_{r1})O_2$ (wherein 0<p<1, 0<q<1, 0<r1<1, p+q+r1=1) or $Li(Ni_{p1}Co_{q1}Mn_{r2})O_4$ (wherein 0<p1<2, 0<q1<2, 0<r2<2, p1+q1+r2=2), etc.), or a lithium-nickel-cobalt-transition metal (M) oxide (e.g., $Li(Ni_{p2}Co_{q2}Mn_{r3}A_{s2})O_2$ (wherein M is selected from the group consisting of Al, Fe, V, Cr, Ti, Ta, Mg, and Mo, and p2, q2, r3, and s2 are each an atomic fraction of independent elements, and 0<p2<1, 0<q2<1, 0<r3<1, 0<s2<1, p2+q2+r3+s2=1), etc.) and the like, and any one thereof or a compound of two or more thereof may be included. Among these, in terms of being able to increase the capacity and stability of a battery, the lithium transition metal composite oxide may be $LiCoO_2$, $LiMnO_2$, $LiNiO_2$, a lithium nickel-manganese-cobalt oxide (e.g., $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, etc.), or a lithium-nickel-cobalt-aluminum oxide (e.g., $Li(Ni_{0.8}Co_{0.15}Al_{0.05})O_2$, etc.), and the like. When considering an remarkable improvement effect according to the control of type and content ratio of constituent elements forming a lithium transition metal composite oxide, the lithium transition metal composite oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, and the like, and any one thereof or a mixture of two or more thereof may be used.

The positive electrode active material may be included in the positive electrode active material layer in an amount of 80 wt % to 99 wt %, preferably 92 wt % to 98.5 wt % in consideration of exerting sufficient capacity of the positive electrode active material.

The positive electrode active material layer may further include a positive electrode binder and/or a positive electrode conductive material in addition to the positive electrode active material described above.

The positive electrode binder is a component for assisting in binding of an active material, a conductive material, and the like, and binding to a current collector, and specifically, may include at least one selected from the group consisting of a polyvinylidene fluoride, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, styrene-butadiene rubber, and fluorine rubber, preferably polyvinylidene fluoride.

The positive electrode binder may be included in the positive electrode active material layer in an amount of 1 wt % to 20 wt %, preferably 1.2 wt % to 10 wt % in terms of securing sufficient binding force between components such as a positive electrode active material.

The positive electrode conductive material may be used to assist and improve conductivity in the secondary battery, and is not particularly limited as long as it has conductivity without causing a chemical change. Specifically, the positive electrode conductive material may include graphite such as natural graphite or artificial graphite; a carbon-based material such as carbon black, acetylene black, Ketjen black, channel black, furnace black, lamp black, and thermal black; conductive fiber such as carbon fiber and metal fiber; a conductive tube such as a carbon nanotube; metal powder such as fluorocarbon powder, aluminum powder, and nickel powder; a conductive whisker such as zinc oxide and potassium titanate; a conductive metal oxide such as titanium oxide; and a polyphenylene derivative, and may preferably include carbon black in terms of improving conductivity.

In terms of facilitating the dispersion of the positive electrode conductive material when preparing a slurry for forming a positive electrode active material layer and further improving electrical conductivity, the specific surface area of the positive electrode conductive material may be 80 $m^2/g$ to 200 $m^2/g$, preferably 100 $m^2/g$ to 150 $m^2/g$.

The positive electrode conductive material may be included in the positive electrode active material layer in an amount of 1 wt % to 20 wt %, preferably 1.2 wt % to 10 wt % in terms of securing sufficient electrical conductivity.

The thickness of the positive electrode active material layer may be 30 μm to 400 μm, preferably 50 μm to 110 μm, in consideration of the adjustment of the N/P ratio described above, and the like.

The positive electrode may further include a positive electrode current collector. Specifically, the positive electrode current collector may formed on the positive electrode active material layer.

The positive electrode current collector is not particularly limited as long as it has conductivity without causing a chemical change in the battery. Specifically, copper, stainless steel, aluminum, nickel, titanium, fired carbon, copper or stainless steel that is surface-treated with one of carbon, nickel, titanium, silver, and the like, an aluminum-cadmium alloy, and the like may be used as the positive electrode current collector.

The positive electrode current collector may typically have a thickness of 3 μm to 500 μm.

The positive electrode current collector may have microscopic irregularities formed on the surface thereof to improve the adhesion of the positive electrode active material. For example, the positive electrode current collector may be used in various forms such as a film, a sheet, a foil, a net, a porous body, a foam, and a non-woven body.

The positive electrode may be manufactured by coating a positive electrode slurry including a positive electrode active material, and selectively, a positive electrode binder, a positive electrode conductive material, and a solvent for forming a positive electrode slurry on the positive electrode current collector, followed by drying and roll-pressing.

The solvent for forming a positive electrode slurry may include an organic solvent such as N-methyl-2-pyrrolidone (NMP), and may be used in an amount such that a preferred viscosity is achieved when the positive electrode active material, and selectively, the binder, the conductive material, and the like are included. For example, the solvent for forming a positive electrode slurry may be included in the positive electrode slurry in an amount such that the concentration of a solid including the positive electrode active material, and selectively, the binder and the conductive material is 50 wt % to 95 wt %, preferably 70 wt % to 90 wt %.

The porosity of the positive electrode may be 20% to 35%. The porosity of the positive electrode may be measured using the method for measuring the porosity of a negative electrode of Equation 2 described above.

In the present invention, a ratio $d_1/d_2$ of the thickness $d_1$ of the negative electrode active material layer to the thickness $d_2$ of the positive electrode active material layer may be 0.4 to 0.7, preferably 0.47 to 0.65, more preferably 0.48 to 0.53. The secondary battery having the above-described $d_1/d_2$ range may easily achieve the above-described N/P ratio, and accordingly, the ratio of the silicon-based active material into which lithium is intercalated from the positive electrode to all active materials may be decreased, Thus, it is preferable in that the deterioration in lifespan properties caused by the volume expansion of the silicon-based active material may be prevented at the entire battery level.

The separator is to separate the negative electrode and the positive electrode and to provide a movement path for lithium ions. Any separator may be used without particular limitation as long as it is a separator commonly used in a secondary battery. Particularly, a separator having excellent moisture-retention of an electrolyte as well as low resistance to ion movement in the electrolyte is preferable. Specifically, a porous polymer film, for example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, polyethylene terephthalate fiber, or the like may be used. Furthermore, a coated separator including a ceramic component or a polymer material may be used to secure heat resistance or mechanical strength, and may be used in a single-layered or a multi-layered structure, selectively.

In addition, the electrolyte used in the present invention may be an organic liquid electrolyte, an inorganic liquid electrolyte, a solid polymer electrolyte, a gel-type polymer electrolyte, a solid inorganic electrolyte, a molten-type inorganic electrolyte, and the like, all of which may be used in the manufacturing of a secondary battery, but is not limited thereto.

Specifically, the electrolyte may include an organic solvent and a lithium salt.

Any organic solvent may be used without particular limitation as long as it may serve as a medium through which ions involved in an electrochemical reaction of a battery may move. Specifically, as the organic solvent, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2 to C20 hydrocarbon group and may include a double-bond aromatic ring or ether bond); amides such as dimethylformamide; dioxolanes such as 1,3-dioxolane; or sulfolanes may be used. Among the above solvents, a carbonate-based solvent is preferable, and a mixture of a cyclic carbonate (e.g., ethylene carbonate or propylene carbonate) having a high ionic conductivity and a high dielectric constant, which may increase charging/discharging performance of the battery, and a low-viscosity linear carbonate-based compound (e.g., ethylmethyl carbonate, dimethyl carbonate, or diethyl carbonate) is more preferable. In this case, the performance of the electrolyte may be excellent when the cyclic carbonate and the chain carbonate are mixed in a volume ratio of about 1:1 to about 1:9.

Any compound may be used as the lithium salt without particular limitation as long as it may provide lithium ions used in a lithium secondary battery. Specifically, as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, $LiB(C_2O_4)_2$, or the like may be used. The lithium salt may be used in a concentration range of 0.1-2.0 M. When the concentration of the lithium salt is in the above range, the electrolyte has suitable conductivity and viscosity, thereby exhibiting excellent performance, and lithium ions may effectively move.

According to a typical method for manufacturing a secondary battery, the secondary battery may be manufactured by interposing a separator between the negative electrode and the positive electrode described above, and then injecting an electrolyte solution thereto.

The secondary battery according to the present invention is useful for portable devices such as a mobile phone, a notebook computer, and a digital camera, and in the field of electric vehicles such as a hybrid electric vehicle (HEV), and in particular, may be preferably used as a component battery for a medium-to-large-sized battery module. Therefore, the present invention also provides a medium-to-large-sized battery module including the secondary battery as described above as a unit cell.

A medium-to-large-sized battery module as described above may be preferably applied to a power source which requires high output and large capacity, such as an electric vehicle, a hybrid electric vehicle, and a power storage device.

Hereinafter, Examples of the present invention will be described in detail so that those skilled in the art may easily carry out the present invention. However, the present invention may be embodied in many different forms, and is not limited to Examples set forth herein.

EXAMPLES

Example 1: Manufacturing of Secondary Battery

<Manufacturing of Negative Electrode>

A silicon-based active material Si (Average particle diameter ($D_{50}$): 3.5 μm), which is a negative electrode active material, carbon black (Product name: Super C65, Manufacturer: Timcal), which is a negative electrode conductive material, and a mixture (Weight average molecular weight: about 360,000 g/mol) in which polyvinyl alcohol and polyacrylic acid are mixed in a weight ratio of 66:34, which is a negative electrode binder, were added to distilled water, which is a solvent for forming a negative electrode slurry, in a weight ratio of 70:10:20 to prepare a negative electrode slurry (Solid content concentration: 25 wt %).

The negative electrode slurry was coated on one surface of a copper current collector (Thickness: 15 μm), which is a negative electrode current collector, with a loading amount of 4.28 mg/cm² (10.1 mAh/cm²), roll-pressed twice (first roll-pressing gap 0.97 μm, second roll-pressing gap 1.19 μm) using a roll press, and then dried in a vacuum oven at 130° C. for 10 hours to form a negative electrode active material layer (Thickness: 36.1 μm), which was prepared as a negative electrode according to Example 1 (Thickness of negative electrode: 51.1 μm, porosity of negative electrode 40.9%).

<Manufacturing of Positive Electrode>

$LiNi_{0.6}Co_{0.2}Mn_{0.2}O_2$ (Average particle diameter ($D_{50}$): 11.5 μm), which is a positive electrode active material, carbon black (Product name: Super C65, Manufacturer: Timcal), which is a positive electrode conductive material, and polyvinylidene fluoride (PVdF), which is a positive electrode binder, were added in a weight ratio of 97:1.5:1.5 to N-methyl-2-pyrrolidone (NMP), which is a solvent for forming a positive electrode slurry, to prepare a positive electrode slurry (Solid content concentration: 78 wt %).

The positive electrode slurry was coated on one surface of an aluminum current collector (Thickness: 12 μm), which is a positive electrode current collector, with a loading amount of 24.71 mg/cm² (5.0 mAh/cm²), roll-pressed, and then dried in a vacuum oven at 130° C. for 10 hours to form a positive electrode active material layer (Thickness: 74 μm) which was prepared as a positive electrode according to Example 1 (Thickness of positive electrode: 86 μm, porosity 23.8%).

<Manufacturing of Secondary Battery>

A polyethylene separator was interposed between the negative electrode and the positive electrode which were manufactured above, and an electrolyte was injected thereto to manufacture a secondary battery of Example 1. The electrolyte was prepared by adding vinylene carbonate in an amount of 3 wt % based on the total weight of the electrolyte and $LiPF_6$, which is a lithium salt, at a concentration of 1 M to an organic solvent in which fluoroethylene carbonate (FEC) and diethyl carbonate (DEC) were mixed in a volume ratio of 30:70.

<Measurement of N/P Ratio>

The negative electrode manufactured above was cut to a predetermined size to prepare a negative electrode sample. A lithium metal electrode having the same size as the negative electrode sample was prepared, and then was opposed to the negative electrode sample. A polyethylene separator was interposed between the negative electrode sample and the lithium metal electrode, and then an electrolyte solution was injected thereto to manufacture a coin-type half-cell. The electrolyte solution was prepared by adding LiPF$_6$, which is a lithium salt, at a concentration of 1 M to an organic solvent in which ethylene carbonate and ethylmethyl carbonate were mixed in a volume ratio of 50:50. The discharge capacity obtained by charging/discharging the coin-type half-cell at 0.1 C was divided by the weight of the negative electrode active material included in the negative electrode sample to obtain the discharge capacity of the negative electrode sample per unit weight of the negative electrode active material.

In addition, the positive electrode manufactured above was cut to a predetermined size to prepare a positive electrode sample. A lithium metal electrode having the same size as the positive electrode sample was prepared, and then was opposed to the positive electrode sample. A polyethylene separator was interposed between the positive electrode sample and the lithium metal electrode, and then an electrolyte solution was injected thereto to manufacture a coin-type half-cell. The electrolyte solution was prepared by adding LiPF$_6$, which is a lithium salt, at a concentration of 1 M to an organic solvent in which ethylene carbonate and ethylmethyl carbonate were mixed in a volume ratio of 50:50. The discharge capacity obtained by charging/discharging the coin-type half-cell at 0.1 C was divided by the weight of the positive electrode active material included in the positive electrode sample to obtain the discharge capacity of the positive electrode sample per unit weight of the positive electrode active material.

The above-measured discharge capacity of the negative electrode sample per unit weight of the negative electrode active material was multiplied by the weight of the negative electrode active material of the secondary battery manufactured in Example 1, and then divided by the area of the negative electrode to obtain the discharge capacity per unit area of the negative electrode of Example 1. Also, the discharge capacity of the positive electrode sample per unit weight of the positive electrode active material was multiplied by the weight of the positive electrode active material of the secondary battery manufactured in Example 1, and then divided by the area of the positive electrode to obtain the discharge capacity per unit area of the positive electrode of Example 1.

The discharge capacity per unit area of the negative electrode was divided by the discharge capacity per unit area of the positive electrode to obtain an N/P ratio of 2.01.

Examples 2 to 3 and Comparative Examples 1 to 4

A secondary battery of each of Examples 2 and 3 and Comparative Examples 1 to 4 was manufactured in the same manner as in Example 1, except that the loading amount of each of the negative electrode slurry and the positive electrode slurry prepared in Example 1 was adjusted as shown in Table 1 below.

The N/P ratio, loading amount, porosity, thickness, and the like of the secondary battery of each of Examples 2 and 3 and Comparative Examples 1 to 4 are shown in Table 1 below.

Example 4

A secondary battery of Example 4 was manufactured in the same manner as in Example 1, except that the gap of the roll press during the first roll-pressing was set to 0.79 μm and the gap of the roll press during the second roll-pressing was set to 1.11 μm in the manufacturing of the negative electrode.

In the secondary battery of Example 4, the thickness of the negative electrode active material layer was 32.5 μm, the thickness of the negative electrode was 47.5 μm, and the porosity of the negative electrode was 34.3%.

Example 5

A secondary battery of Example 5 was manufactured in the same manner as in Example 1, except that the gap of the roll press during the first roll-pressing was set to 1.01 μm and the gap of the roll press during the second roll-pressing was set to 1.76 μm in the manufacturing of the negative electrode.

In the secondary battery of Example 5, the thickness of the negative electrode active material layer was 41 μm, the thickness of the negative electrode was 56 μm, and the porosity of the negative electrode was 48.0%.

Comparative Example 5

A carbon-based active material artificial graphite (Average particle diameter ($D_{50}$): 15 μm), which is a negative electrode active material, carbon black (Product name: Super C65, Manufacturer: Timcal), which is a negative electrode conductive material, and a mixture in which carboxymethyl cellulose and styrene-butadiene rubber are mixed in a weight ratio of 30:70, which is a negative electrode binder, were added to distilled water, which is a solvent for forming a negative electrode slurry, in a weight ratio of 94:2:4 to prepare a negative electrode slurry (Solid content concentration: 48 wt %).

The negative electrode slurry was coated on one surface of a copper current collector (Thickness: 8 μm), which is a negative electrode current collector, with a loading amount of 29.81 mg/cm$^2$ (10.18 mAh/cm$^2$), roll-pressed, and then dried in a vacuum oven at 130° C. for 10 hours to form a negative electrode active material layer (Thickness: 192.0 μm), which was prepared as a negative electrode according to Comparative Example 5 (Thickness of negative electrode: 200 μm, porosity 28.8%).

A secondary battery of Comparative Example 5 was manufactured in the same manner as in Example 1, except that the negative electrode according to Comparative Example 5 was used.

The N/P ratio, loading amount, porosity, thickness, and the like of the secondary battery of Comparative Example 5 are shown in Table 1 below.

TABLE 1

| Classification | Negative electrode active material | N/P ratio | Loading amount mg/cm² | mAh/cm² | Porosity (%) | Thickness of negative electrode active material layer ($d_1$, μm) | Thickness of positive electrode active material layer ($d_2$, μm) | $d_1/d_2$ |
|---|---|---|---|---|---|---|---|---|
| Example 1 | Si | 2.01 | 4.28 | 10.1 | 40.9 | 36.1 | 74.0 | 0.49 |
| Example 2 | Si | 2.33 | 4.94 | 11.6 | 40.1 | 41.0 | 74.0 | 0.55 |
| Example 3 | Si | 2.58 | 5.47 | 12.9 | 40.1 | 45.4 | 74.0 | 0.61 |
| Example 4 | Si | 2.01 | 4.28 | 10.1 | 34.3 | 32.5 | 74.0 | 0.44 |
| Example 5 | Si | 2.01 | 4.28 | 10.1 | 48.0 | 41.0 | 74.0 | 0.55 |
| Comparative Example 1 | Si | 1.67 | 3.54 | 8.34 | 40.1 | 29.4 | 74.0 | 0.40 |
| Comparative Example 2 | Si | 1.89 | 4.01 | 9.44 | 40.3 | 33.4 | 74.0 | 0.45 |
| Comparative Example 3 | Si | 2.87 | 6.10 | 14.34 | 40.9 | 51.3 | 74.0 | 0.69 |
| Comparative Example 4 | Si | 3.10 | 6.59 | 15.51 | 40.8 | 55.5 | 74.0 | 0.75 |
| Comparative Example 5 | Artificial graphite | 2.04 | 29.81 | 10.18 | 28.8 | 192.0 | 74.0 | 2.59 |

EXPERIMENTAL EXAMPLES

Experimental Example 1: Evaluation of Capacity Retention Rate

The secondary battery manufactured in each of Examples 1 to 5 and Comparative Examples 1 to 5 was evaluated for capacity retention rate using an electrochemical charge/discharge device.

The secondary battery was 1) charged (0.1 C CC/CV charge 4.2 V 0.05 C cut) and discharged (0.1 C CC discharge 3.0 V cut), which was set as the first cycle, and 2) charged and discharged from the second cycle to the 100th cycle under the conditions of charge (0.5 C CC/CV charge 4.2 V 0.05 C cut) and discharge (0.5 C CC discharge 3.0 V cut).

The capacity retention rate was evaluated by Equation 3 below. The results are shown in Table 2 below.

Capacity retention rate (%)={(Discharge capacity at $100^{th}$ cycle)/(Discharge capacity at $1^{st}$ cycle)}× 100 [Equation 3]

TABLE 2

| | Capacity retention rate (%)@ 100 cycle |
|---|---|
| Example 1 | 92.2 |
| Example 2 | 91.1 |
| Example 3 | 90.9 |
| Example 4 | 91.2 |
| Example 5 | 90.1 |
| Comparative Example 1 | 84.7 |
| Comparative Example 2 | 88.9 |
| Comparative Example 3 | 68.6 |
| Comparative Example 4 | 66.7 |
| Comparative Example 5 | 77.1 |

The secondary battery of each of Examples has an N/P ratio of 1.92 to 2.60, thereby minimizing the influence of the volume expansion/contraction according to the charge and discharge of the silicon-based active material on the battery, and thus, has a capacity retention rate much higher than that of the secondary battery of each of Comparative Examples.

Experimental Example 2: Evaluation of High-Speed Charging Lifespan

The secondary battery manufactured in each of Examples 1 to 5 and Comparative Examples 1 to 5 was evaluated for capacity retention rate during high-speed charging, using an electrochemical charge/discharge device. The secondary battery was 1) charged (0.1 C CC/CV charge 4.2 V 0.05 C cut) and discharged (0.1 C CC discharge 3.0 V cut), which was set as the first cycle, and 2) charged and discharged from the second cycle to the 100th cycle under the conditions of charge (2.0 C CC/CV charge 4.2 V 0.05 C cut) and discharge (0.5 C CC discharge 3.0 V cut).

The capacity retention rate was evaluated by Equation 4 below. The results are shown in Table 3 below.

Capacity retention rate (%)={(Discharge capacity at $100^{th}$ cycle)/(Discharge capacity at $1^{st}$ cycle)}× 100 [Equation 4]

TABLE 3

| | Capacity retention rate (%)@ 100 cycle |
|---|---|
| Example 1 | 89.8 |
| Example 2 | 80.4 |
| Example 3 | 72.1 |
| Example 4 | 78.5 |
| Example 5 | 82.4 |
| Comparative Example 1 | 43.2 |
| Comparative Example 2 | 73.8 |
| Comparative Example 3 | 67.6 |
| Comparative Example 4 | 57.3 |
| Comparative Example 5 | 5.7 |

The secondary battery of each of Examples has an N/P ratio of 1.92 to 2.60, thereby minimizing the influence of the volume expansion/contraction according to the charge and discharge of the silicon-based active material on the battery, and thus, has a high-speed capacity retention rate much higher than that of the secondary battery of each of Comparative Examples.

Experimental Example 3: Evaluation of Energy Density

The secondary battery manufactured in each of Examples 1 to 5 and Comparative Examples 1 to 5 was charged and discharged one time under the following conditions, and the discharge capacity (Unit: Wh) of the secondary battery was obtained.

At this time, the thickness of the secondary battery after the charge was measured, and the thickness of the secondary battery obtained above was multiplied by the area of the secondary battery to obtain the volume (Unit: liter (L)) of the secondary battery.

The discharge capacity of the secondary battery obtained above was divided by the volume of the secondary battery to calculate energy density (Unit: Wh/L). The results are shown in Table 4 below.

<Charging and Discharging Condition>
Charge: CC/CV charge, 0.33 C, 4.2V, 5% cut-off Discharge: CC discharge, 0.33 C, 3.2V

TABLE 4

|  | Energy density (Wh/L) |
| --- | --- |
| Example 1 | 568 |
| Example 2 | 534 |
| Example 3 | 507 |
| Example 4 | 580 |
| Example 5 | 537 |
| Comparative Example 1 | 630 |
| Comparative Example 2 | 587 |
| Comparative Example 3 | 475 |
| Comparative Example 4 | 452 |
| Comparative Example 5 | 398 |

Referring to Table 4, it can be seen that the secondary battery of each of Examples shows a desirable level of energy density. Although the secondary battery of each of Comparative Examples 1 and 2 shows an energy density equal to or higher than the secondary battery of each of Examples, it can be seen that the cycle capacity retention rate and the cycle capacity retention rate during high-speed charging are significantly lower as described above. In the case of Comparative Examples 3 to 5, it can be seen that the lifespan properties as well as the energy density are not desirable.

The invention claimed is:

1. A secondary battery comprising:
a negative electrode including a negative electrode active material layer containing a negative electrode active material;
a positive electrode facing the negative electrode and including a positive electrode active material layer containing a positive electrode active material;
a separator interposed between the positive electrode and the negative electrode; and
an electrolyte,
wherein the negative electrode active material includes a silicon-based active material,
the silicon-based active material contains Si,
an average particle diameter ($D_{50}$) of the silicon-based active material is 1 μm to 3.5 μm,
a porosity of the negative electrode is 37% to 45%, and
an N/P ratio calculated by Equation 1 below is 1.92 to 2.60, N/P ratio=Discharge capacity per unit area of negative electrode/Discharge capacity per unit area of positive electrode. [Equation 1]

2. The secondary battery of claim 1, wherein the N/P ratio is 1.98 to 2.45.

3. The secondary battery of claim 1, wherein a thickness of the negative electrode active material layer is 35 μm to 50 μm.

4. The secondary battery of claim 1, wherein:
the negative electrode active material layer further comprises a negative electrode conductive material and a negative electrode binder;
the negative electrode active material layer includes the negative electrode active material in an amount of 50 wt % to 80 wt %; the negative electrode conductive material in an amount of 5 wt % to 20 wt %; and the negative electrode binder in an amount of 10 wt % to 30 wt %.

5. The secondary battery of claim 4, wherein the negative electrode binder comprises at least one selected from the group consisting of styrene butadiene rubber, acrylonitrile butadiene rubber, acrylic rubber, butyl rubber, fluoro rubber, polyvinyl alcohol, carboxymethyl cellulose, starch, hydroxypropyl cellulose, regenerated cellulose, polyacrylic acid, polyethylene glycol, polyacrylonitrile, and polyacryl amide.

6. The secondary battery of claim 1, wherein:
the positive electrode active material includes a lithium composite transition metal oxide,
wherein the lithium composite transition metal oxide includes at least one transition metal selected from the group consisting of nickel, cobalt, manganese, and aluminum, and lithium.

7. The secondary battery of claim 1, wherein a ratio $d_1/d_2$ of a thickness $d_1$ of the negative electrode active material layer to a thickness $d_2$ of the positive electrode active material layer is 0.4 to 0.7.

8. The secondary battery of claim 1, wherein the N/P ratio is 2.01 to 2.33.

9. A secondary battery comprising:
a negative electrode including a negative electrode active material layer containing a negative electrode active material;
a positive electrode facing the negative electrode and including a positive electrode active material layer containing a positive electrode active material;
a separator interposed between the positive electrode and the negative electrode; and
an electrolyte,
wherein the negative electrode active material includes a silicon-based active material,
a porosity of the negative electrode is 37% to 45%, and
an N/P ratio calculated by Equation 1 below is 1.92 to 2.60, N/P ratio=Discharge capacity per unit area of negative electrode/Discharge capacity per unit area of positive electrode [Equation 1]

wherein, a ratio $d_1/d_2$ of the thickness $d_1$ of the negative electrode active material layer to the thickness $d_2$ of the positive electrode active material layer is 0.47 to 0.65.

10. The secondary battery of claim 9, wherein the N/P ratio is 1.98 to 2.16.

11. The secondary battery of claim 9, wherein the N/P ratio is 2.01 to 2.33.

12. The secondary battery of claim 9, wherein an average particle diameter ($D_{50}$) of the silicon-based active material is 1 μm to 3.5 μm.

* * * * *